(No Model.)
A. H. KEMPE.
BICYCLE.
No. 484,857. Patented Oct. 25, 1892.
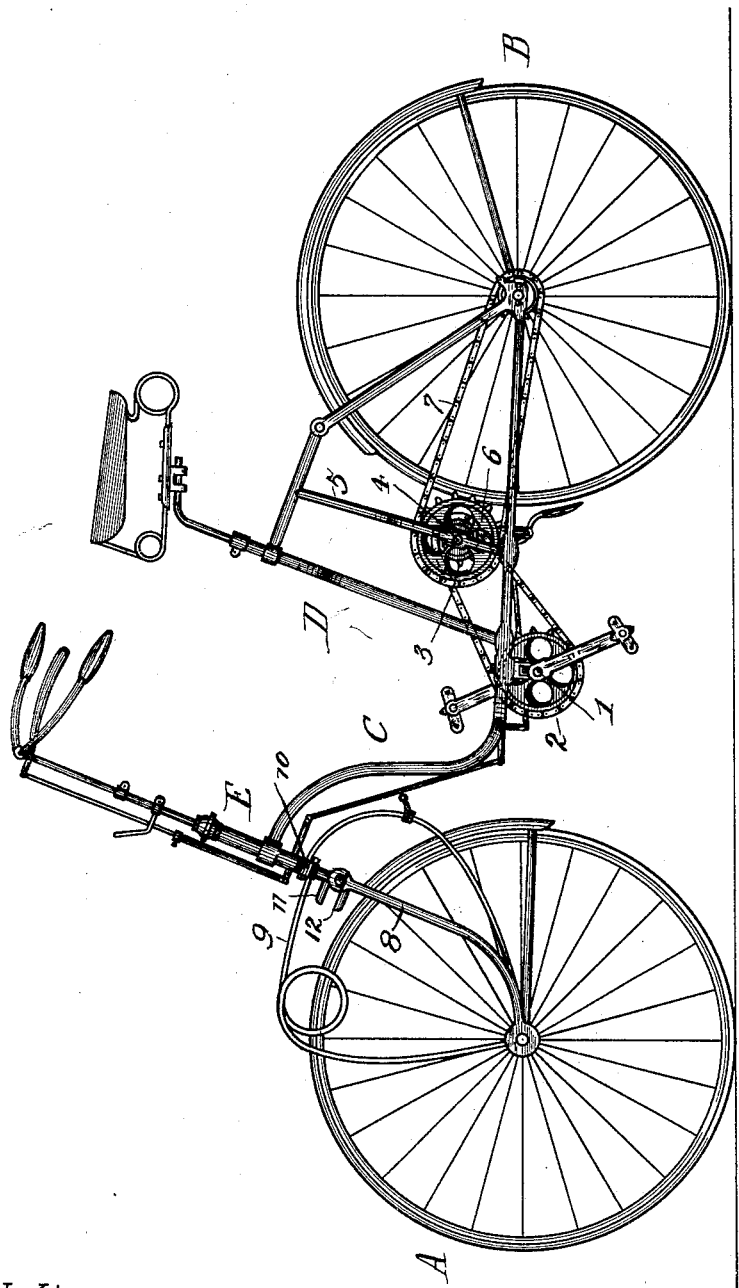
Witnesses:
S. C. Gladden
J. D. Langhorne
Inventor:
Arnold H. Kempe
by Spear & Seely
Attorneys

UNITED STATES PATENT OFFICE.

ARNOLD H. KEMPE, OF OAKLAND, CALIFORNIA.

BICYCLE.

SPECIFICATION forming part of Letters Patent No. 484,857, dated October 25, 1892.

Application filed January 5, 1892. Serial No. 417,063. (No model.)

*To all whom it may concern:*

Be it known that I, ARNOLD H. KEMPE, a citizen of the United States, residing at Oakland, in the county of Alameda and State of California, have invented certain new and useful Improvements in Bicycles; and I do hereby declare that the following is a full, clear, and exact description thereof.

My invention relates to that class of velocipedes known as "Safety bicycles," in which two wheels of substantially the same diameter are connected by a frame which supports a seat for the rider and a transverse shaft provided with cranks and pedals. The rear wheel is the driver, and the crank-shaft carries a sprocket-wheel geared to another sprocket-wheel on the rear axle by a driving-chain, the object being to obtain a relatively-slow rotation of the crank-shaft and a relatively-high speed in the rear wheel.

The object of my invention is to increase the speed of the driving-wheel relatively to the crank-shaft, and, further, to provide yielding supports or forks for the front or steering wheel by means of springs. In connection with the latter feature of my invention I have provided a safety device applied automatically in case of breakage of one or both springs, which will prevent any injury to the rider should such a breakage occur.

My invention is illustrated in the accompanying drawing, which shows a side elevation of my bicycle.

A and B represent the wheels, of ordinary construction; C, the frame connecting them; D, the seat-standard; and E the steering-rod. Supported in the frame between the two wheels is a transverse shaft 1, upon which are secured the cranks carrying the pedals. The connecting-frame is divided or forked between the two wheels, so that its arms extend back upon both sides of the driver, the latter being journaled in them. Mounted centrally upon the shaft 1 is a sprocket-wheel 2, having any desired number of teeth, from which wheel a driving-chain extends to a small pinion 3, the latter being mounted upon a shaft 4, journaled in standards 5, the latter forming part of the frame. The relative sizes of the wheels 2 and 3 are such that the shaft 4, to which motion is transmitted by the chain, will move at much greater speed than the crank-shaft.

I do not confine myself to any particular size of wheels or to any particular number of teeth upon either, since under differing conditions these may be varied indefinitely. Secured upon the shaft 4 and at one side of the machine is a sprocket-wheel 6, of greater diameter than the wheel 3, but having the same rate of speed as the latter, since it is secured upon the same shaft. The axle of the rear wheel is geared up to high speed by means of a chain 7, which connects the sprocket 6 to a relatively-small sprocket-wheel on said axle. It will thus be seen that between the crank-shaft and the rear wheel I gear up twice, and this enables me to impart to the driving-wheel a very much greater speed than could possibly be obtained by the use of direct gearing between the crank-shaft and the rear wheel, as commonly employed.

As before stated, I do not confine myself to any particular sizes for these wheels; but in the drawing I have indicated gearing which will give approximately four revolutions of the driving-wheel to one of the crank-shaft. This of course may be indefinitely increased within the limits of the power required to drive the machine.

The steering-rod E is jointed to the front forks, as shown at 8, so as to permit the front forks and steering-wheel to have an independent longitudinal movement. This movement is regulated and limited by springs 9, one upon each side of the wheel. While these springs may each be formed in one piece, I prefer to make them in two parts, one end of each part being connected to a lug 10 on the steering-rod and the other end to the lower part of the fork. At the lower end of the steering-rod and at the junction of the forks are projections 11 12 in close proximity to one another. If one or both of the springs should break, thus letting the wheel forward, the forward movement could only continue until the lower projection 12 is brought in contact with the upper projection 11, at which time the wheel will be rigidly held. This constitutes a complete safety device and avoids the possibility of a dangerous fall and consequent injury to the rider.

My bicycle is fitted with the usual accessories, such as a brake, saddle, &c., and such are shown in the drawing, although they form no part of my invention.

What I claim is—

In combination with the main frame carrying the crank-shaft, the seat-standard thereon having a forked brace connecting with the rear axle, the standards 5, extending between the brace and the frame in rear of the seat-standard and having an auxiliary shaft journaled thereon, a large sprocket-wheel on the crank-shaft connecting with a small wheel on the auxiliary shaft, and a second large wheel on the auxiliary shaft, connected with a smaller wheel on the rear hub, all substantially as and for the purpose set forth.

In testimony whereof I have affixed my signature, in presence of two witnesses, this 23d day of December, 1891.

ARNOLD H. KEMPE.

Witnesses:
 L. W. SEELY,
 G. B. STUBBS.